Sept. 26, 1967   C. J. DAUBENBERGER   3,343,217
PRESS MOLDING APPARATUS
Filed July 8, 1964

INVENTOR.
CHARLES J. DAUBENBERGER
BY *Elliott & Pastoriza*
ATTORNEYS ly. The higher temperature in the central portion of the mold structure results in thermal expansion to an extent that greater forces on the material are exerted in the central portions than at the outer side portions. As a consequence, while a net substantially constant force may be applied to the closing of the press, central areas of the opposing surface portions of the press will exert larger forces on the correspondingly positioned central portions of the mold. It would be desirable to compensate for force variations over the entire area of the mold as a consequence of thermal expansion.

United States Patent Office

3,343,217
Patented Sept. 26, 1967

3,343,217
PRESS MOLDING APPARATUS
Charles J. Daubenberger, North Hollywood, Calif., assignor to Daco Rubber, Inc., a corporation of California
Filed July 8, 1964, Ser. No. 381,108
1 Claim. (Cl. 18—16)

ABSTRACT OF THE DISCLOSURE

This disclosure relates to an improved press molding apparatus wherein the material being molded is characterized by a reaction resistance force to the closing of the press which varies. To overcome this problem and provide an improved molded product, the press includes a novel press plate structure and force applying means wherein the force is applied by two hydraulic cylinders spaced closer to the outer ends of the plate than at the center portion so that the forces applied to the outer end of the plate is greater than at the center to compensate for thermal warping of the plate, the center portion of the plate being hotter than the outer portions. In addition, the force applied by the hydraulic cylinders is controlled by an actuating means to exert a constant force not withstanding the variation in the reaction resistance force offered by the material. This is achieved by a valve means which is responsive to the pressure of fluid in the piston and cylinders, this pressure in turn being responsive to the reaction resistance force of the material. The arrangement is such that a constant force is applied to the closing of the press at all times, this constant force generally resulting in a variable speed of closing of the press.

---

Figure 1:
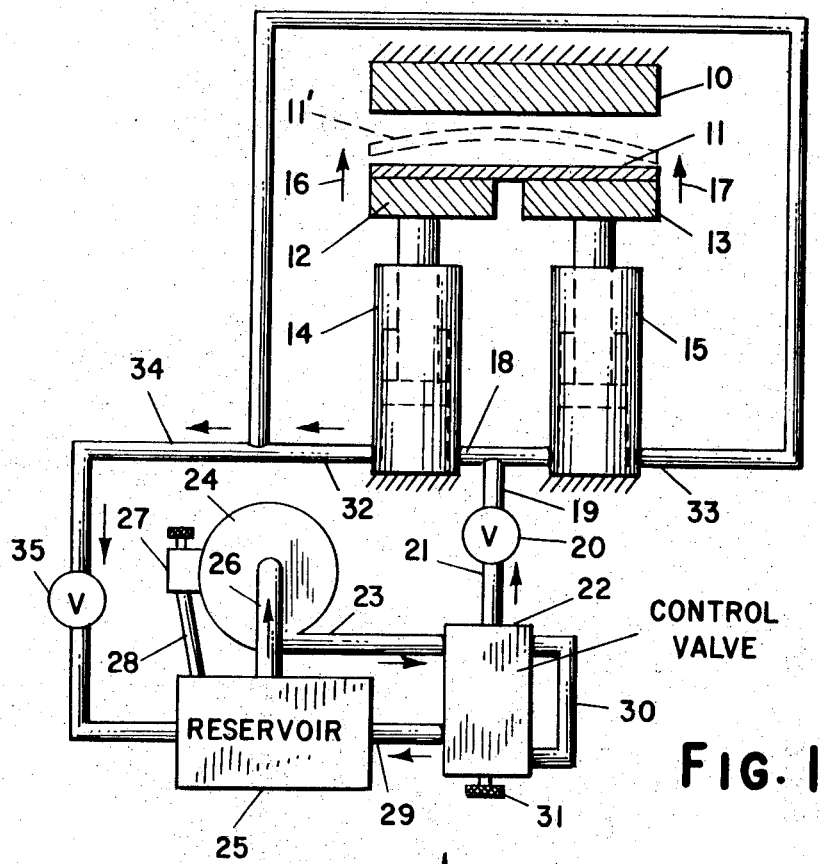

This invention relates generally to molding presses and more particularly to an improved press apparatus for molding rubber articles.

In my co-pending patent application Ser. No. 120,232, filed June 28, 1961, and entitled, "Molding Apparatus," now United States Patent No. 3,145,422, there is disclosed unique mold means which eliminates "flash" from internal openings in molded rubber products such as electrical plugs. The hydraulic press apparatus employed with the mold structure itself provides a pressure to bring suitable mold plates together so that pins on one of the mold plates will penetrate into the mold material, such as rubber, and this effect a molding of the rubber material into a shape having the desired internal openings.

It is found that greatly improved products can be attained if the closing pressure of the mold plates onto the mold material is substantially constant at all times. Normally such a constant force is difficult to achieve since the resistance to penetration of the mold forms by the mold material varies depending upon the depth of penetration of the mold forms. Thus, to maintain a constant closing force on the material as the mold parts on the plates are brought together by the press, it is necessary that the rate of closing of the press vary in accordance with the resistance offered by the material. When the resistance or reaction force offered by the mold material is relatively small, the press closes rapidly in order to effect a constant closing force. If the resistance of the material becomes larger, then the press must close more slowly in order to maintain the constant penetrating force of the mold parts in coming together.

In addition to the foregoing, it is found that when a substantial mold surface area is involved and heat is applied, the central portions of the mold structure become heated to a greater extent than the outer portions. This is because the outer portions are closer to the exterior of the press apparatus and can radiate heat away more easily. The higher temperature in the central portion of the mold structure results in thermal expansion to an extent that greater forces on the material are exerted in the central portions than at the outer side portions. As a consequence, while a net substantially constant force may be applied to the closing of the press, central areas of the opposing surface portions of the press will exert larger forces on the correspondingly positioned central portions of the mold. It would be desirable to compensate for force variations over the entire area of the mold as a consequence of thermal expansion.

With all of the foregoing in mind, it is accordingly principal objects of this invention to provide an improved press molding apparatus, in which: first, the opposing press portions are brought together on the mold material with a force that is constant notwithstanding variations in the resistance of the mold material to the closure of the press thereon; and in which, second, a uniform force over the entire area of the opposing press structure is insured notwithstanding the presence of thermal gradients causing different expansion rates to occur at different areas of the mold.

Briefly, these and other objects and advantages of this invention are attained by providing a press molding structure including two opposing press means between which molded material together with suitable mold structures are received. One of the press means is in the form of a flexible plate to which closing forces for the press are applied. These closing forces are preferably provided by first and second hydraulic cylinder and piston means disposed beneath the flexible plate. The physical arrangement is such that a greater force is exerted on the outside portions of the plate than at the center portion so that when the press is closed and heat is applied, the greater thermal reaction forces generated at the center portion of the plate will be compensated for by the greater forces exerted by the hydraulic cylinders and pistons adjacent the outer sides of the plate. As a consequence, the flexible plate remains substantially flat so that the force exerted to close the press is substantially uniform over the entire plate area.

In addition to the foregoing, the hydraulic cylinder and piston arrangement is operated by hydraulic fluid from a source passing through a pressure controlled valve means. The arrangement is such that a variable volume of hydraulic fluid is passed to the cylinders and pistons in such a manner that the force of closing of the press is substantially constant throughout the closing operation notwithstanding that the reaction resistance of the mold material will vary during the closing of the press. In the preferred embodiment of this portion of the invention, the pressure controlled valve means includes a variable orifice the size of which is automatically adjusted in response to the pressure of fluid passed to the hydraulic cylinders and pistons. This variable orifice serves to pass part of the fluid back to a reservoir to provide a variation in volume of fluid passed to the press so that the net result is a substantially constant closing force even through the rate of closing varies.

Figure 2:
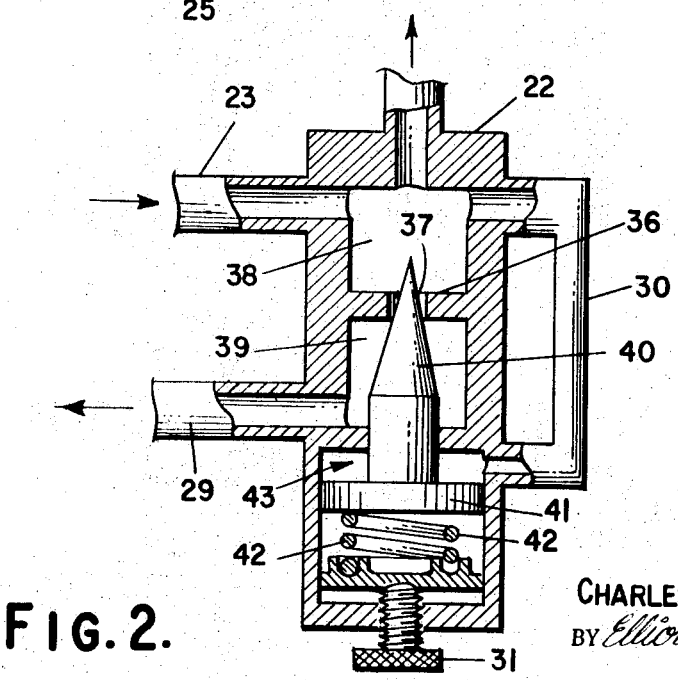

A better understanding of the invention as well as further features and advantages thereof will be had by now referring to a preferred embodiment thereof as schematically illustrated in the accompanying drawings, in which:

FIGURE 1 is a diagrammatic view illustrating the press molding apparatus of this invention; and, FIGURE 2 is a greatly enlarged illustration partly cut away and partly in cross-section of a pressure controlled valve means incorporated in the apparatus of FIGURE 1.

Referring first to FIGURE 1, there is illustrated a press structure including opposed top and bottom press means in the form of plates 10 and 11. In the embodiment chosen for illustrative purposes, the top plate 10 is stationary and the bottom plate 11 is adapted to be moved toward the top plate 10 to close the press. Suitable material to be molded, together with the molds themselves to be urged into the material (not shown), are received between the plates 10 and 11 so that closing of the press plates will exert a pressure on the molding apparatus. In this respect, the mold structure and mold material itself may be exactly as described in my aforementioned co-pending patent application.

In accordance with a first feature of this invention, the plate 11 is relatively flexible and is engaged on its under outer side portions by first and second bases 12 and 13. These base members in turn are arranged to be moved upwardly as by first and second hydraulic cylinder and piston means 14 and 15. It will be noted that the first and second base members 12 and 13 are disposed in side-by-side spaced relationship and that the cylinder and piston structures 14 and 15 are positioned to exert forces on these base members which are closer to the outer sides of the base members and plate 11 than to the center. As a consequence, a greater force is applied to outer portions of the flexible plate 11 than to its central portion as indicated by the arrows 16 and 17.

In FIGURE 1 it will be noted that the plate 11 is indicated in dotted lines as 11' as being bowed. This situation would obtain in the event that the cylinder and piston means 14 and 15 were respectively centered to apply substantially the same force to the center of the plate 11 as at the outer sides, the bowing occurring as a consequence of thermal expansion and thus resulting in a further force being exerted on the central portion of the press during a molding operation. By disposing the cylinder and piston means 14 and 15 closer to the outer sides than to the center as shown in FIGURE 1, a greater force is provided adjacent the outer sides of the plate 11 described to compensate for this thermal expansion to the end that the dotted line illustration would appear flat when pressure and heat are applied during the molding curing cycle.

A common hydraulic line 18 connects to both of the cylinder and piston means 14 and 15 for providing fluid to these cylinders. The line 18 receives fluid from a line 19 including a check valve 20 and line 21 passing from a pressure controlled valve means 22. Fluid is received in the pressure controlled valve means through a line 23 from a variable volume and variable displacement pump 24. A fluid reservoir 25 in turn provides hydraulic fluid through line 26 to the inlet of the pump 24. A pressure relief valve 27 is provided on the pump 24 so that if a predetermined pressure is exceeded, fluid will pass from the pump 24 directly through a line 28 back to the reservoir 25.

The reservoir also is connected by a line 29 to the pressure controlled valve means 22 to receive fluid from this valve means. In this respect, the valve means is designed such that pressure of fluid from the pump 24 will determine the amount of fluid returned through the line 29 to the reservoir 25. Towards this end there is provided a control hydraulic line 30 connected between various chambers in the valve 22 and an adjustment means 31 as will be described in detail subsequently.

The hydraulic circuitry is completed by outlet lines 32 and 33 from the cylinders 14 and 15. These lines connect to a common line 34 passing through a dump valve 35 back to reservoir 25.

In the operation of the press structure described thus far, a mold apparatus with mold material is inserted between the plates 10 and 11 and the press closed by passing hydraulic fluid from the pump 24 through the pressure controlled valve 22, check valve 20, and common line 18 to the lower portions of the cylinders 14 and 15 to raise the pistons therein. The volume of fluid provided to the pistons 14 and 15 and thus the rate of closure of the press is under control of the valve means 22. The arrangement is such that the press will close with a constant force and since the resistance of the mold material to closing of the press varies, the rate of closure will vary to result in this constant closing force.

When it is desired to open the press, the dump valve 35 is opened and the weight of the members 12 and 13 and lower portion of the press will return the pistons to their lowermost position, thereby forcing fluid through the outlet lines 32 and 33 to the common line 34 and valve 35 back to the reservoir 25.

The manner in which the pressure and volume of the fluid passed to the cylinders 14 and 15 is controlled by the control valve means 22 will be evident by now referring to FIGURE 2.

As shown, the valve means 22 includes a valve body having a partition 36 including a central opening 37. The partition 36 defines first and second valve chambers 38 and 39. A tapered pin 40 is positioned to extend into the central opening 37 as shown and it will be evident that the taper is such as to vary the effective size of this opening thereby providing a variable orifice depending upon the longitudinal position of the tapered pin 40.

The pin 40 terminates at its rear end in a piston 41. A compression spring 42, which may be adjusted by the knob 31, exerts a bias force on the piston 41 tending to move the tapered pin 40 in a forward direction further through the central opening 37, thus tending to decrease the effective size of this opening. The piston 41 also defines with a part of the valve body a third chamber 43 which is in communication with the first chamber 38 by means of the control hydraulic line 30. As a consequence, the pressure of hydraulic fluid passing from the pump 24 to the inlet line 23 to the first chamber 38 will be communicated to the forward side of the piston 41 through the control line 30, this pressure tending to retract the tapered pin 40 from the central opening 37. This pressure is balanced by the pressure of the spring 42. The return line 29 to the reservoir 25 extends from the second chamber 39 as shown.

In the operation of the valve means, fluid under a given pressure will pass through the inlet line 23 to the first chamber 38. Most of this fluid will then pass up the line 21 to the cylinders. If the resistance of the mold material increases, this reaction force against closing of the press will result in an increase in the pressure of fluid in the chamber 38 of the valve. This increase in pressure will be immediately communicated through the control line 30 to the third chamber 43 and thus cause the tapered pin 40 to retract slightly. Retraction of the tapered pin 40 increases the effective size of the central opening 37 so that fluid in the chamber 38 will pass through the central opening 37 and back to the reservoir 25 through the return line 29. Thus, the volume of fluid passed up the line 21 to the cylinders will decrease resulting in a slower rate of closing of the press. On the other hand, should the resistance of the mold material decrease, the reaction force will result in a decrease of fluid pressure in the chamber 38 and thus in the third chamber 43 so that the spring 42 will tend to move the tapered pin 40 further through the central opening 37 to decrease the effective size of the orifice. As a consequence, a greater volume of fluid will be passed up the line 21 and less fluid will return to the reservoir 25 through the return line 29. Therefore, the press will close at a faster rate.

The overall result of the foregoing action is that a dynamic balance is established between the fluid pressure in the third chamber 43 and the pressure applied by the biasing spring 42 so that the tapered pin 40 will vary the size of the central opening 37 in accordance with resistance changes to penetration of the mold apparatus into the mold material so that essentially a constant force of closing is always realized.

The constant closing force in combination with the unique piston cylinder means 14 and 15 being in off-center positions to insure that the constant force applied is uniform over the entire area of the flexible plate 11 in spite of thermal gradients in the mold apparatus results in greatly improved molded products.

While only one particular embodiment of the invention has been shown and described, it will be evident to those skilled in the art that various equivalent structures incorporating the principles of the invention could be employed without departing from the scope and spirit of the invention. The improved press molding apparatus is therefore not to be thought of as limited to the one embodiment set forth for illustrative purposes.

What is claimed is:

A hydraulic press molding apparatus comprising, in combination: a press structure including top and bottom spaced press means adapted to receive therebetween material to be molded wherein said material is characterized in that its resistance to closing of said top and bottom press means varies, said bottom press means including a plate opposing said top press means; first and second base members in side-by-side spaced relationship engaging the under outer side portions of said plate; first and second hydraulic cylinder and piston means coupled to said first and second members respectively for moving said plate towards said top press means to close said press, said base members exerting greater forres on the underside of said plate adjacent to the outer sides than at the center to compensate for the greater thermal expansion forces at the center area of said press than at the outer sides during a molding operation so that said plate remains substantially flat; a source of hydraulic fluid under a given pressure; a reservoir for said hydraulic fluid and a pressure controlled valve means connected to said source, reservoir, and said cylinders and responsive to resistance reaction forces by said mold material to vary the rate of closing movement of said press means and to insure a constant force on said plate during closing of said press on said material notwithstanding that said resistance reaction forces offered by said material vary, said pressure controlled valve means including a valve body, a partition dividing said valve body to define first and second valve chambers, said partition having a central opening; a pin having a forward tapered portion receivable in said central opening, said valve body including a third chamber into which the rear portion of said pin extends, said rear portion terminating in a piston head centrally disposed in said third chamber; an inlet hydraulic line passing from said source of hydraulic fluid to said first chamber; an outlet line passing from said first chamber to said hydraulic cylinder and piston means; a control hydraulic line passing from said first chamber to said third chamber to provide pressure on said piston head in a direction to retract said pin from said central opening to increase the effective size of said opening; a return hydraulic line passing from said second chamber to said reservoir; and a bias means carried on said valve body to exert a pre-set force against said piston head to bias said pin into said central opening whereby pressure from said source acts through said control hydraulic line to vary said effective opening and bypass fluid back to said reservoir so that fluid supplied to said cylinder and piston means results in said constant force on said plate.

References Cited

UNITED STATES PATENTS

| | | | |
|---|---|---|---|
| 1,552,768 | 9/1925 | Smith | 60—52 |
| 1,588,972 | 6/1926 | Machacek | 60—52 |
| 2,182,833 | 12/1939 | Winegar | 18—17 |
| 2,420,052 | 5/1947 | Muir | 103—42 |
| 2,665,704 | 1/1954 | Kanuck | 137—115 X |
| 2,706,891 | 4/1955 | Greer | 60—54.5 X |
| 2,820,250 | 1/1958 | Stratton | 18—16 |
| 2,874,751 | 2/1959 | Norton | 18—17 X |
| 2,969,806 | 1/1961 | Jensen et al. | 137—115 X |
| 2,980,173 | 4/1961 | Perkey | 137—494 X |
| 3,241,189 | 3/1966 | Siempelkamp | 18—17 |

J. SPENCER OVERHOLSER, *Primary Examiner.*

J. HOWARD FLINT, JR., *Examiner.*